(12) United States Patent
Smith et al.

(10) Patent No.: US 12,092,585 B2
(45) Date of Patent: Sep. 17, 2024

(54) ULTRAVIOLET LIGHT-BASED INSPECTION FOR DETECTING COATING DEFECTS IN MANUFACTURED WEBS USING FLUORESCING AGENTS

(71) Applicant: 3M INNOVATIVE PROPERTIES COMPANY, St. Paul, MN (US)

(72) Inventors: Jason P. Smith, St. Paul, MN (US); Steven P. Floeder, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/768,151

(22) PCT Filed: Nov. 4, 2020

(86) PCT No.: PCT/IB2020/060375
§ 371 (c)(1),
(2) Date: Apr. 11, 2022

(87) PCT Pub. No.: WO2021/090208
PCT Pub. Date: May 14, 2021

(65) Prior Publication Data
US 2024/0094139 A1      Mar. 21, 2024

Related U.S. Application Data

(60) Provisional application No. 62/932,717, filed on Nov. 8, 2019.

(51) Int. Cl.
*G01N 21/89*      (2006.01)
*G01N 21/64*      (2006.01)
*G01N 35/10*      (2006.01)

(52) U.S. Cl.
CPC ..... *G01N 21/8901* (2013.01); *G01N 21/6428* (2013.01); *G01N 21/6456* (2013.01); *G01N 35/10* (2013.01)

(58) Field of Classification Search
CPC ........... G01N 21/8901; G01N 21/6428; G01N 21/6456; G01N 35/10
See application file for complete search history.

(56) References Cited

U.S. PATENT DOCUMENTS

| 3,075,853 A | 1/1963 | Striker et al. |
| 2016/0069807 A1* | 3/2016 | Hatanaka ............. G01N 21/359 250/205 |

(Continued)

FOREIGN PATENT DOCUMENTS

| CN | 204087359 U | 1/2015 |
| EP | 1097352 A1 | 5/2001 |

(Continued)

OTHER PUBLICATIONS

International Search report for PCT International Application No. PCT/IB2020/060375 mailed on Feb. 3, 2021, 5 pages.

*Primary Examiner* — Kiho Kim
(74) *Attorney, Agent, or Firm* — Philip P. Soo

(57) ABSTRACT

Techniques are described for automatically detecting defects in webs using ultraviolet light to excite fluorescing agents in various layers of the web. In one example. a system for detecting defects in the web includes an inspection device and a processing unit. The inspection device includes a lighting unit, a filter, and an image capture device. The lighting unit is configured to emit ultraviolet light having a first wavelength to the web, the web including a fluorescing agent configured to emit light having a second wavelength upon excitation by the ultraviolet light. The image capture device is configured to capture one or more images of the light having the second wavelength after the light has passed (Continued)

through the filter. The processing unit is configured to determine whether the web includes a defect based on the one or more images.

17 Claims, 7 Drawing Sheets

(56) References Cited

U.S. PATENT DOCUMENTS

| | | | |
|---|---|---|---|
| 2019/0049381 A1* | 2/2019 | Ritoniemi | D21G 9/0009 |
| 2019/0331602 A1* | 10/2019 | Hobbs, Jr. | G01N 21/63 |

FOREIGN PATENT DOCUMENTS

| | | | |
|---|---|---|---|
| JP | 07005121 A | 1/1995 |
| JP | 2000084475 A | 3/2000 |
| JP | 2005346937 A | 12/2005 |
| JP | 2007309685 A | 11/2007 |
| JP | 2015152412 A | 8/2015 |
| JP | 2019052868 A | 4/2019 |
| WO | 1995032060 A1 | 11/1995 |
| WO | 2003060461 A2 | 7/2003 |

\* cited by examiner

ULTRAVIOLET LIGHT-BASED INSPECTION FOR DETECTING COATING DEFECTS IN MANUFACTURED WEBS USING FLUORESCING AGENTS

Cross Reference to Related Applications

This application is a national stage filing under 35 U.S.C. 371 of PCT/IB2020/060375, filed Nov. 4, 2020, which claims the benefit of Provisional Application No. 62/932,717, filed Nov. 8, 2019, the disclosure of which is incorporated by reference in its/their entirety herein.

TECHNICAL FIELD

The disclosure relates to manufacturing systems and, in particular, inspection systems for optically inspecting sheets or webs of manufactured film.

BACKGROUND

Manufacturing processes for making various types of films, such as adhesive coated films, involve manufacturing the films in a long continuous sheet, referred to as a web. The web itself is generally a material having a fixed width in one direction ("crossweb direction") and either a predetermined or indeterminate length in the orthogonal direction ("downweb direction") along the manufacturing line. In many scenarios, a dispensing unit is used to apply a coating to various layers of the web as the web traverses the manufacturing line. Various operating parameters and conditions may cause the web to include different types of defects, such as small voids where the coating applied by the dispensing unit is missing and/or does not have a desired thickness. Voids in the coating may lead to certain issues. For example, some products such as packaging tape have adhesive coating on one side and a low adhesion coating on the opposite side. Voids in the adhesive coating would result in areas that would not adhere when used for a given application. Conversely, voids in the low adhesion coating may cause certain to stick to adjoining layers when the tape is in roll form. This situation may cause the web to rip or tear when it I unwound for either converting into smaller rolls or when used in final form by the customer. Typically, webs are manually inspected for defects by employees of the manufacturing facility.

SUMMARY

In general, this disclosure describes techniques for inspecting a web for defects using ultraviolet light to excite fluorescing agent(s) in one or more layers of the web. In some examples, the fluorescing agents emit light when excited by ultraviolet light having another wavelength, such as light within the visible spectrum. An image capture device captures one or more images of the web after the web is exposed to the ultraviolet light and a computing system analyzes the images to determine whether the web includes a defect. If a portion of the images is darker than surrounding portions of the image, this may indicate that portion of the web did not have sufficient material for the layer(s) impregnated with the fluorescing agent, indicative of a potential defect in that area of web. Thus, in one example, the computing system determines the web includes a defect if a portion of the image of the web is darker than the surrounding portions, i.e., less fluorescent energy emitted indicates less material. In this way, the example techniques of this disclosure may enable a computing system to detect defects in webs and, in some examples, specific layers within the web. Moreover, the computing system may determine a cause of the defects, which may enable the computing system to alert workers to repair or replace a component of the manufacturing system, thereby potentially increasing the quality of the webs and reducing or eliminating waste in the manufacturing process.

In one example, a system for detecting defects in webs produced by a manufacturing facility includes an inspection device including at least one image capture device and a processing unit. The image capture device includes a lighting unit configured to emit ultraviolet light having a first wavelength to the web, the web comprising a fluorescing agent configured to emit light having a second wavelength upon excitation by the ultraviolet light having the first wavelength, the first wavelength different from the second wavelength; a filter configured to block the light having the first wavelength and pass the light having the second wavelength; and an image capture device configured to capture one or more images of the light having the second wavelength after the light having the second wavelength has passed through the filter. The processing unit is configured to: determine, based on the one or more images, whether the web includes a defect; and output data indicating whether the web includes the defect.

In another example, a method for detecting defects in a web produced by a manufacturing facility includes: emitting, by a lighting unit, ultraviolet light having a first wavelength; emitting, by a fluorescing agent of a web, light having a second wavelength upon excitation by the ultraviolet light having the first wavelength, the second wavelength different than the first wavelength; blocking, by a filter, the ultraviolet light having the first wavelength; passing, by the filter, the light having the second wavelength; capturing, by an image capture device, one or more images of the light having the second wavelength after the light having the second wavelength has passed through the filter; determining, by a processing unit, based on the one or more images, whether the web includes a defect; and outputting, by the processing unit, data indicating whether the web includes the defect.

In yet another example, a web material includes: a first layer comprising a first fluorescing agent configured to emit light having a first wavelength upon excitation by ultraviolet light having a third wavelength, the first wavelength different than the third wavelength; and a second layer comprising a second fluorescing agent configured to emit light having a second wavelength upon excitation by ultraviolet light having a fourth wavelength, the second wavelength different than the first wavelength, the third wavelength, and the fourth wavelength.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
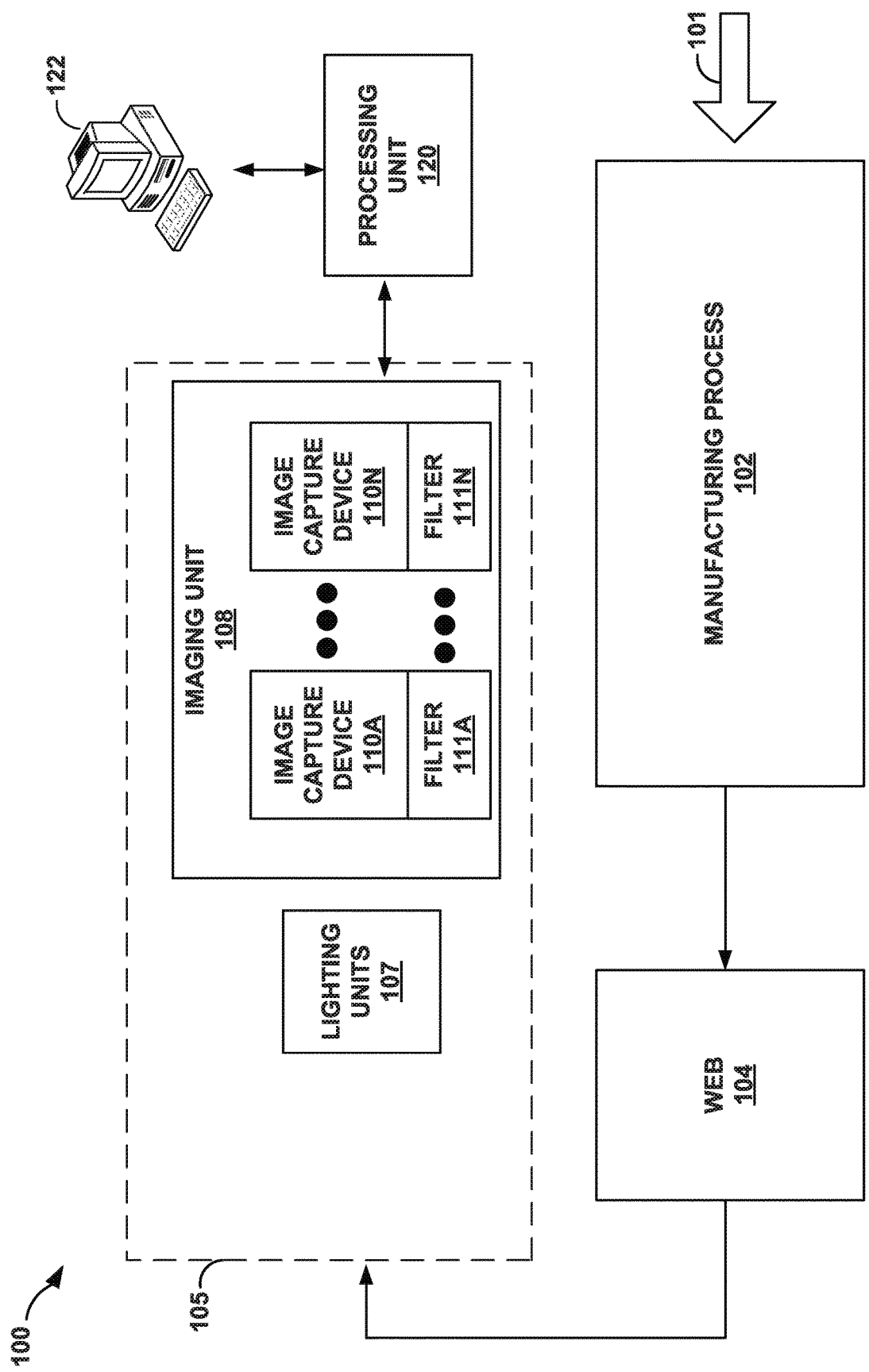
FIG. 1 is a block diagram illustrating a system for manufacturing webs and for imaging and inspecting the webs for defects, in accordance with one or more exemplary implementations and techniques described in this disclosure.

FIG. 1 is a block diagram illustrating a system for manufacturing one or more webs, and for imaging and inspecting the webs for defects, in accordance with one or more exemplary implementations and techniques described in this disclosure. In the example illustrated in FIG. 1, system 100 includes inputs 101, manufacturing process 102, web 104, inspection device 105, imaging unit 108, image capture devices 110A-110N (collectively, "image capture devices 110"), light units 107A-107N (collectively, "light units 112"), processing unit 120, and user interface 122.

Manufacturing process 102 as shown in FIG. 1 receives various inputs 101 (e.g., material, energy, people, machinery) and produces an output including web 104. Manufacturing process 102 is not limited to any particular type or form of manufacturing and is illustrative of any type of manufacturing process operable to produce web 104. In some examples, web 104 includes manufactured web material that may be any web-like material having a fixed dimension in one direction and either a predetermined or indeterminate length in the orthogonal direction. Examples of web materials include metals, paper, wovens, non-wovens, glass, polymeric films, flexible circuits, or combinations thereof. Metals may include such materials as steel or aluminum. Wovens generally include various fabrics. Non-wovens include materials (e.g., paper, filter media, or insulating material). Films include, for example, polymer films. In addition, the web materials may include one or more coatings.

Web 104 includes one or more fluorescing agents that emits light having one peak wavelength (also referred to as the peak emission wavelength) when the fluorescing agent is excited by light having a particular wavelength (also referred to as the excitation wavelength). For example, manufacturing process 102 may include a dispensing unit that dispenses (e.g., sprays) fluorescing agent (or a coating that includes fluorescing agent) onto web 104. In examples where web 104 includes a plurality of fluorescing agents, the various fluorescing agents may be excited by light having the same wavelength. That is, the excitation wavelength of each fluorescing agent may be the same. In some examples, one or more fluorescing agents (e.g., one agent, two agents, all of the different agents) may be excited by light having different respective wavelengths. In other words, the excitation wavelength of at least one fluorescing agent may be different from the excitation wavelength of at least one other fluorescing agent.

In some instances, the peak emission wavelength of the light emitted by the fluorescing agents is the same. That is, each fluorescing agent may emit light having the same peak wavelength. In another instance, one or more fluorescing agents (e.g., one agent, two agents, all of the different agents) may emit light having different respective peak wavelengths. In other words, the peak emission wavelength of at least one fluorescing agent may be different from the peak emission wavelength of at least one other fluorescing agent.

In some scenarios, web 104 includes a plurality of coatings. Examples of coatings include adhesives, hardcoats, low-adhesion backsize coatings, metalized coatings, neutral density coatings, electrically conductive or nonconductive coatings, or combinations thereof. A given coating may be applied to only a portion of the web material or may fully cover the exposed surface of the web material. Further, the web materials may be patterned or unpatterned.

In some examples, one or more coatings include a fluorescing agent. As one example, web 104 may include an adhesive tape (e.g., packing tape, masking tape, single or double-sided tape, among other kinds of adhesive tape). In one example, the adhesive tape includes a plurality of separable layers that are parallelly coupled to one another (e.g., when the layers are laid substantially flat). For example, web 104 may include an adhesive tape with one layer that includes an adhesive and another layer that includes a low-adhesion backsize coating to enable the layers to be separated. In such example, the low-adhesion backsize coating of the protective layer prevents the adhesive layer from sticking to itself when web 104 is rolled into jumbo rolls of tape (e.g., relatively large rolls, such as 1,000 m or more). In one example, the low-adhesion coating includes a fluorescing agent. In another example, the adhesive layer includes a fluorescing agent. As described in detail below, inspection device 105 may capture images of the fluorescing agent to determine whether the coating is applied properly or whether web 104 includes any defects.

During the manufacturing process 102, web 104 may accrue a variety of defects. In some examples, defects include insufficient amounts of coating, irregular or patchy areas of coating, or streaks in the coating. In examples where web 104 includes an adhesive tape, web 104 may stick to itself when rolled into rolls, or may rip or tear when applied to a slitter (not shown) to produce consumer-rolls (e.g., relatively small rolls of adhesive tape, such as 5 m, 10 m, or 50 m rolls).

Inspection device 105 may include lighting units 107, imaging unit 108, and filters 111. At least one of lighting units 107 emit ultraviolet light (e.g., light having a particular wavelength between approximately 250 nm and approximately 375 nm). In some instances, the particular wavelength is a peak wavelength of light emitted by a given lighting unit 107. In some examples, a first lighting unit 107 emits ultraviolet light and a second lighting unit 107 emits visible light (e.g., light having a particular wavelength between approximately 380 nm and approximately 700 nm). In some examples, lighting units 107 emit light having the same or approximately the same particular wavelength (e.g., within manufacturing tolerances). In one example, different lighting units 107 emit light having different peak wavelengths. For example, a first lighting unit 107 may emit light having a peak wavelength of approximately 365 nm and a second lighting unit 107 may emit light having a peak wavelength of approximately 350 nm. Lighting units 107 may emit light having one, two, three, or any number of peak wavelengths. In some examples, the luminosity of each of lighting units 107 may be at least 500 Watts per square meter.

The fluorescing agents of web 104 emit light upon being excited by light emitted by lighting units 107. As described above, the light emitted by web 104 may include ultraviolet light, visible light, or both. In one example, web 104 may be excited by light having one particular wavelength and emit light having another (e.g., longer) particular wavelength. For example, the fluorescing agent of web 104 may be excited by ultraviolet light (e.g., light having an wavelength of approximately 365 nm) and emit visible light (e.g., light having a peak wavelength of approximately 410 nm). In one example, web 104 are additionally or alternatively excited by visible light and emit visible light. Additionally or alternatively, web 104 may be excited by ultraviolet light and emit ultraviolet light.

Imaging unit 108 may include image capture devices 110 and filters 111-111N (collectively, "filters 111"). In some examples, filters 111 are configured to filter light emitted by web 14 and provide filtered light to image capture devices 110. Filters 111 may include longpass filters configured to pass wavelengths of light that are at least a threshold wavelength, bandpass filters configured to pass wavelengths of light between two different threshold wavelengths, or both. In some examples, filters 111 pass the same wavelengths of light. In some examples, different filters 111 pass different wavelengths of light. In one instance, filters 111 include a plurality of bandpass filters that each pass different wavelengths of light. For instance, filter 111A may be configured to pass wavelengths of light within one range of wavelengths (e.g., between approximately 500 nm and approximately 520 nm) and filter 111B may be configured to pass wavelengths of light within a different range of wavelengths (e.g., between approximately 560 nm and approximately 580 nm). In one example, filters 111 include at least one bandpass filter and a longpass filter. For example, filter 111A may be configured to pass wavelengths of light within a range of wavelengths (e.g., between approximately 500 nm and approximately 520 nm) and filter 111B may be configured to pass wavelengths of light that are greater than a threshold range of wavelengths (e.g., greater than approximately 540 nm).

Each of image capture devices 110 may be a camera or other component configured to capture images of web 104. Image capture devices 110 may detect visible light, ultraviolet light, or both. Each of image capture devices 110 may include components capable of capturing image data, such as a video recorder, an infrared camera, a CCD (Charge Coupled Device) array, CMOS (Complementary Metal Oxide Semiconductor) arry, a laser scanner, a line scan camera, a time-delay integration (TDI) camera, or the like. Moreover, the captured image data can include at least one of an image, a sequence of images (e.g., multiple images taken within a time period and/or with an order), a collection of images, or the like.

In some examples, an imaging resolution of image capture devices 110 (e.g., when image capture devices 110 include TDI cameras) is greater than about 10 micrometers (μm) per pixel and less than about 50 μm per pixel. For example, an imaging resolution of image capture devices 110 may be about 25 μm per pixel.

In some scenarios, a sensitivity of image capture devices 110 is at least approximately 4,000

$$4,000 \frac{LSB}{\frac{nJ}{cm^2}}$$

at a wavelength of approximately 400 nm. In one example, the unit $$\frac{LSB}{\frac{nJ}{cm^2}}$$

takes into account the pixel's size to allow for a more accurate camera comparison. In other words, the unit normalizes the sensitivity measurement by the pixel's area to compare cameras with different pixel sizes. In such scenarios, the amount of energy required to increase the least significant bit (LSB) of a digital value output by image capture devices 110 by a value of one is $$\frac{1 \, nJ}{4000 \, cm^2}.$$

Image capture devices capture, in some examples, filtered light that is passed through filters 111. In other words, web 104 emits light having a peak emission wavelength and filters 111 filter the light to provide a filtered view of web 104 to image capture devices 110. In some examples, some areas of the filtered image may be relatively dark when web 104 includes a defect, such as an insufficient amount of coating. For example, when a coating includes a fluorescing agent, areas of web 104 that do not have sufficient levels of coating may also have insufficient levels of fluorescing agent. In such examples, the images captured by image capture devices 110 may include relatively dark areas where the amount of coating, and hence the amount of fluorescing agent, is less than a threshold amount of coating or fluorescing agent. Each image capture device 110 captures one or more filtered images of web 104 and outputs the one or more filtered images to processing unit 120.

In some scenarios, processing unit 120 is configured to determine whether web 104 includes a defect based on the one or more images of web 104. In such scenarios, processing unit 120 may determine whether the images of web 104 include any relatively dark areas. In one example, processing unit 120 performs image thresholding to detect dark areas in the image. For example, processing unit 120 may compare the intensity of each pixel to a threshold intensity and may assign a first value (e.g., a pixel color, such as black) that is indicative of a defect to a pixel of the image when the intensity of that pixel satisfies (e.g., is greater than or equal to) the threshold intensity, and may assign a second value (e.g., white) to the pixel when the intensity does not satisfy (e.g., is less than) the threshold intensity. It is to be understood that processing unit 120 may utilize any thresholding technique known in the art.

Processing unit 120 determines, in some examples, that web 104 includes a defect in response to determining that one or more pixels are assigned the first value (e.g., black). In some examples, the area of the image that is assigned the first value is referred to as the defect area. In one example, the defect area of the image may be a single pixel, such that processing unit 120 may determine web 104 includes a defect in response to determining the intensity of a single pixel is assigned the first value. That is, in some examples, processing unit 120 may determine that web 104 includes a defect in response to detecting a relatively dark area of any size. In another example, processing unit 120 determines that web 104 includes a defect in response to determining the size of the defect area satisfies (e.g., is at least) a threshold size.

Processing unit 120 may determine a type of defect based on the image. Example types of defect include streaks in the fluorescing agent, blemishes in the fluorescing agent, non-uniform distribution of the fluorescent coating, or a combination thereof. In some examples, processing unit 120 determines the type of defect based on the characteristics of the defect area of the image. As one example, processing unit 120 may determine the type of defect includes a streak in the fluorescing agent in response to determining the length of the defect area (e.g., in the downweb direction) satisfies a threshold length (e.g., 5, 10 cm, 1 m, or any other length). For example, dirt on the dispensing unit may prevent fluorescing agent from attaching to web 104 along the length of web 104 until the dirt is removed. In some instances, processing unit 120 determines the type of defect includes blemishes in the fluorescing agent in response to determining that web 104 includes a plurality of defect areas (e.g., at least a threshold number of defect areas). For instance, air bubbles in the dispensing unit may cause web 104 to have blemish areas that have very little fluorescing agent (or none), such that the images captured by image capture devices 110 may include dark spots. In one example, processing unit 120 determines the type of defect includes a non-uniform distribution of fluorescing agent in response to determining that one portion of the image of web 104 is at least a threshold amount darker than another portion of the image. For example, if the dispensing unit is mispositioned or incorrectly aligned over web 104, one side of web 104 may receive relatively little fluorescing agent (or none). Processing unit 120 may determine a difference in intensity between one side of the image and the other side of the image. In such examples, processing unit 120 may determine that the type of defect is a non-uniformity defect in response to determining that the difference satisfies a threshold intensity.

Processing unit 120 may determine a cause of the defect in response to determining that web 104 includes a defect. Example causes of defects include a dirty dispensing unit, air bubbles trapped within the dispensing unit, or a mispositioned dispensing unit. In some examples, processing unit 120 determines the cause of the defect based on the type of defect. For example, processing unit 120 may determine the cause of the defect includes a dirty dispensing unit in response to determining the type of defect is a streak defect. In another example, processing unit 120 determines the cause of the defect includes air bubbles within the dispensing unit in response to determining the type of defect is a blemish defect. In yet another example, processing unit 120 determines the cause of the defect includes a mispositioned dispensing unit in response to determining that the type of defect is a non-uniform distribution of the fluorescing agent.

In some scenarios, processing unit 120 determines a location of the defect within web 104. For example, processing unit 120 may determine a location in the crossweb direction and the downweb location based on the images. In some examples, processing unit 120 determines a quantity or density of defects within web 104 or within a portion of web 104.

Processing unit 120 performs an action in response to determining that web 104 includes a defect. In some examples, the action includes outputting a command that causes manufacturing process 102 to pause or stop manufacturing web 103. In one example, the action includes outputting a notification indicating that web 104 includes a defect. In some instances, the notification also includes data indicating a type and/or a cause of the defect.

In some examples, processing unit 120 performs an action in response to detecting a defect by adjusting operation of the dispensing unit that dispenses the coating and/or fluorescing agent. For example, processing unit 120 may output a command causing the dispensing unit to adjust a volume of coating and/or fluorescing agent applied to web 104, which may increase the thickness of the coating and/or fluorescing agent. Increasing the thickness may improve the intensity or luminosity of light emitted by web 104, which may improve the accuracy of defect detection by processing unit 120. As another example, processing unit 120 may output a command causing the dispensing unit to adjust a spatial distribution of the fluorescing agent by adjusting position of a dispensing unit such that the dispensing unit applies the coating and/or fluorescing agent to web 104 with a more uniform distribution.

Processing unit 120 may determine whether to convert web 104 to consumer products (also referred to as consumer-rolls or sheet parts) based on the quantity of defects, density of defects, location of defects, size of defects, or a combination thereof. For example, processing unit 120 may determine to discard an entire web 104 in response to determining the quantity of defects satisfies (e.g., is greater than or equal to) a threshold quantity. In another example, processing unit 120 may determine to discard a portion of web 104 in response to determining that the quantity of defects in one portion satisfies the threshold quantity. For example, processing unit 120 may determine to discard an edge portion of web 104 (e.g., in the crossweb direction) and that the remaining portion of web 104 is suitable for converting to consumer products. In this way, processing unit 120 may selectively convert web 104 or portions of web 104 into consumer-rolls.

In some examples, the non-defective or usable webs 104 are converted into consumer-rolls by cutting web 104 into relatively small, individual products (e.g., 5 m, 10 m, or 50 m rolls). As described above, examples of consumer-rolls include packing tape, masking tape, or any other adhesive tape.

In this way, system 100 may automatically detect defects in one or more webs created by a manufacturing facility. In contrast to examples where a human manually inspects a small portion of the web after the web is manufactured, system 100 may increase the accuracy of detecting defects by automatically detecting defects along the entire web. By more accurately detecting defects in the web, the system may increase an efficiency of the manufacturing facility and increase the quality of webs produced by the manufacturing facility.

Figure 2:
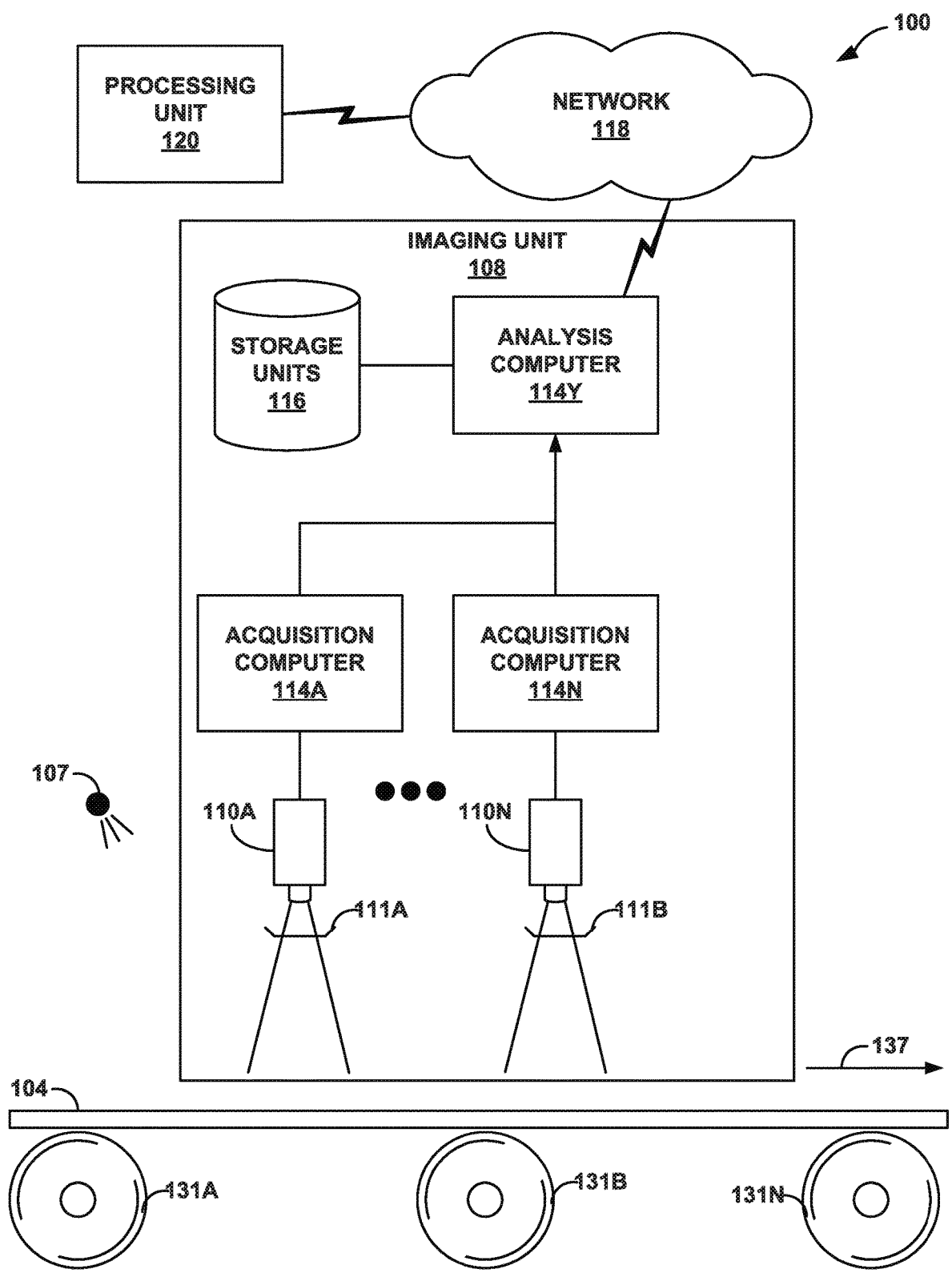
FIG. 2 is a block diagram illustrating additional details of the system of FIG. 1, in accordance with one or more exemplary implementations and techniques described in this disclosure.

FIG. 2 is a block diagram illustrating additional details of system 100 of FIG. 1, in accordance with one or more exemplary implementations and techniques described in this disclosure. As shown in FIG. 2, system 100 includes image capture devices 110, idlers 131A-131N, acquisition computers 114A-114N (collectively, "acquisition computers 114"), analysis computer 114Y, storage units 116, network 118, and processing unit 120.

System 100 includes image capture devices 110A-110N arranged to inspect webs continuously advanced past the image capture devices. In the exemplary embodiment of inspection system 100 as shown in FIG. 2, web 104 is positioned on idlers 131. Image capture devices 110 are positioned adjacent to a surface of web 104 so that each of image capture devices 110 may capture an image of web 104 as web 104 advances through imaging unit 108. The number of image capture devices that may be included in image capture devices 110A-110N is not limited to a particular number of devices and may be one, two, or more devices.

Referring to FIG. 2, during the imaging process that may be performed using system 100, web 104 may advance across idlers 131 in a direction generally indicated by arrow 137.

As shown in FIG. 2, image capture devices 110 are positioned in proximity to the idlers 131 carrying the plurality of webs. As web 104 moves along idlers 131 in the direction indicated by arrow 137, image capture devices 110 are arranged to image web 104 to obtain image data.

Filters 111 filter light as web 104 traverses idlers 131. In one example, filters 111 include a longpass filter configured to block wavelengths of light that do not satisfy a threshold wavelength (e.g., is less than) and pass wavelengths of light that satisfy (e.g., are greater than or equal to) the threshold wavelength. Filters 111 may include a bandpass filter configured to block wavelengths of light outside of a threshold range of wavelengths and pass wavelengths of light within the threshold range (e.g., between two threshold wavelengths).

Image captures devices 110 detect light emitted by web 104 after the light has passed through filters 111. That is, in some examples, image capture devices 110 may detect the light emitted by the fluorescing agents of web 104 without detecting light emitted by lighting units 107 or other light sources. Image capture devices 110 each provide electrical output signals representative of sensed images of web 104 to a respective set of acquisition computers 114A-114N. Acquisition computers 114A-114N are coupled to analysis computer 114Y and are arranged to provide an output representative of image data captured by the corresponding image capture devices 110A-110N to analysis computer 114Y. In some cases, the acquisition and analysis may occur on the same computer. In other embodiments, image capture devices 110A-110N may provide a digital data stream and/or an analog signal representative of the images captured by the cameras directly to a computing device, such as analysis computer 114Y, for further processing by processing circuitry included in analysis computer 114Y.

In one example, processing circuitry of analysis computer 114Y processes image streams including image data provided from acquisition computers 114A-114N, or in the alternative directly from image capture devices 110A-110N, as web 104 advances through imaging unit 108 on idlers 131. Analysis computer 114Y may also be arranged to output the image data to a database, such as storage units 116 and/or storage units of processing unit 120.

Analysis computer 114Y may be configured to perform one or more pre-processing operations on the images captured by image capture devices 110 before forwarding the images to processing unit 120. Pre-processing of the images may include one or some combination of performing one-dimensional or two-dimensional spatial convolutions, ranked filtering (median), contrast enhancement, static flat-field correction, difference of filtered images processing, and/or frequency processing on the image data. Examples of spatial convolutions that may be used to pre-process the image data may include neighborhood averaging, Gaussian kernels gradient filtering, and/or directional edge enhancement. Examples of difference of filtered image processing may include processing based on difference of Gaussians for the image data. Examples of frequency transforms may include processing in frequency space to remove artifacts and then application of an inverse transform.

Processing unit 120 receives the images and may be configured to provide any of the features ascribed to processing unit 120 as illustrated and described with respect to FIG. 1. For example, processing unit 120 may analyze the images to determine whether web 104 includes any defects, such as voids in the fluorescing agents of one or more layers of web 104. Processing unit 120 may perform image thresholding to determine whether the intensity of any areas of the image of web 104 satisfies a threshold intensity. For example, if a particular area of an image is relatively dark such that the intensity does not satisfy the threshold intensity, this may indicate that the particular area lacked enough fluorescing agent, which may indicate a lack of sufficient coating. Processing unit 120 may determine web 104 includes a defect in response to determining that the intensity of one or more areas of the images of web 104 does not satisfy (e.g., is less than) a threshold intensity.

A user interface (e.g., user interface 122 of FIG. 1) may be coupled to processing unit 120 and may be used to provide graphical displays that are indicative of the results of the analysis of the plurality of sets of reference images. For example, the user interface may indicate whether web 104 includes any defects. In one example, the user interface indicates a location, size, shape, cause, and/or type of such defects.

As shown in FIG. 2, processing unit 120 and analysis computer 114Y may be coupled to network 118. Network 118 is not limited to any particular type of network, and may be any network, including the internet, a Local Area Network (LAN), a Wide Area Network (WAN) using any type of communication protocol that allows the devices coupled to network 118 to communicate with one another.

Figure 3:
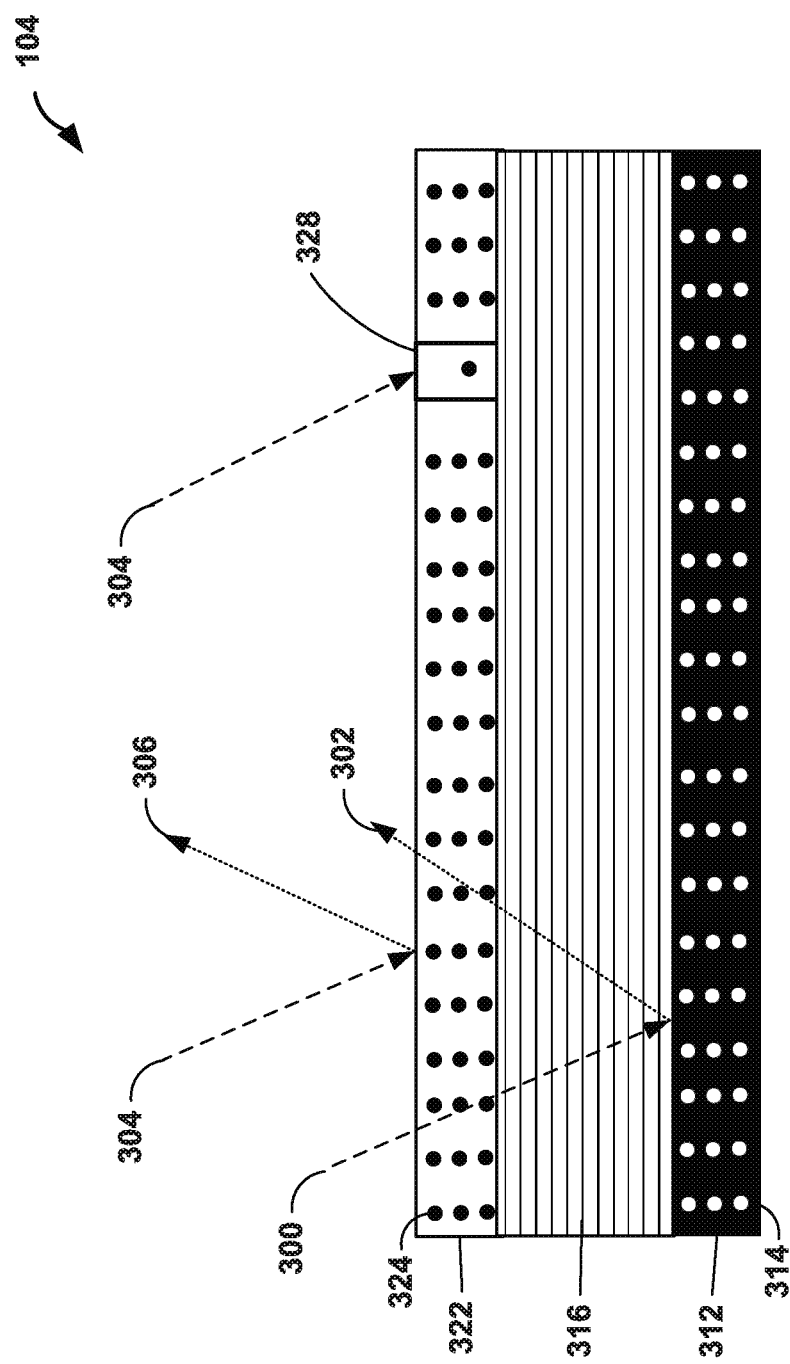
FIG. 3 is a conceptual diagram illustrating an example web having a defect, in accordance with one or more exemplary implementations and techniques described in this disclosure.

FIG. 3 is a conceptual diagram illustrating an example web 104, in accordance with one or more exemplary implementations and techniques described in this disclosure. In one example, web 104 includes an adhesive tape, such as a cellophane tape, that is configured to stick with application of pressure (e.g., without the need for solvent for activation). In the example of FIG. 3, web 104 includes a plurality of layers including adhesive 312, tape backing 316, and low-adhesion backsize 322. In one example, tape backing 316 may include a paper, plastic film, metal foil, or other material that is coated with an adhesive 312 on one side and low-adhesion backsize 322 on another side.

In the example of FIG. 3, adhesive 312 includes fluorescing agent 314 and low-adhesion backsize 322 includes fluorescing agent 324. Fluorescing agents 314 and 324 may be the same fluorescing agent or different fluorescing agent. Examples of fluorescing agents include 7-aminocoumarin dyes, carboxylic acid succinimidyl ester (e.g., Alexa Fluor 350®), 2,5-thiophenediylbis (e.g., Tinopal OB®), among others.

In some scenarios, fluorescing agent 314 is excited by light 300 having one wavelength and fluorescing agent 324 is excited by light 304 having another wavelength. The excitation wavelengths of fluorescing agents 314 and 324 may be different or may be the same. In one example, the excitation wavelength of at least one fluorescing agent is in the ultraviolet spectrum. In one example, the excitation wavelength of one fluorescing agent is in the ultraviolet spectrum and the excitation wavelength of another fluorescing agent is in the visible spectrum.

Fluorescing agent 314 is configured to emit light 302 having one peak wavelength upon excitation by light 300. Similarly, fluorescing agent 324 is configured to emit light 306 having a second peak wavelength upon excitation by light 304. In one example, the peak wavelength of light 302 and 306 emitted by fluorescing agents 314 and 324, respectively, is different from the excitation wavelength of fluorescing agent 314 and the excitation wavelength of fluorescing agent 324.

Fluorescing agents 314 and 324 may have the same peak emission wavelength or different peak emission wavelengths. The peak emission wavelengths may be in the ultraviolet, visible spectrum, infrared spectrum, or multiples thereof. In one scenario, the peak wavelength of the light 306 emitted by fluorescing agent 324 is different from the peak wavelength of the light 302 emitted by fluorescing agent 314. In such scenarios, by utilizing fluorescing agents with different peak emission wavelengths and using filters 111 that pass different wavelengths of the light emitted by the various fluorescing agents, different image capture devices 110 may capture images of different layers of web 104, such that processing unit 120 may detect defects in different layers of web 104 and determine which layers of web 104 include defects.

Figure 4B:
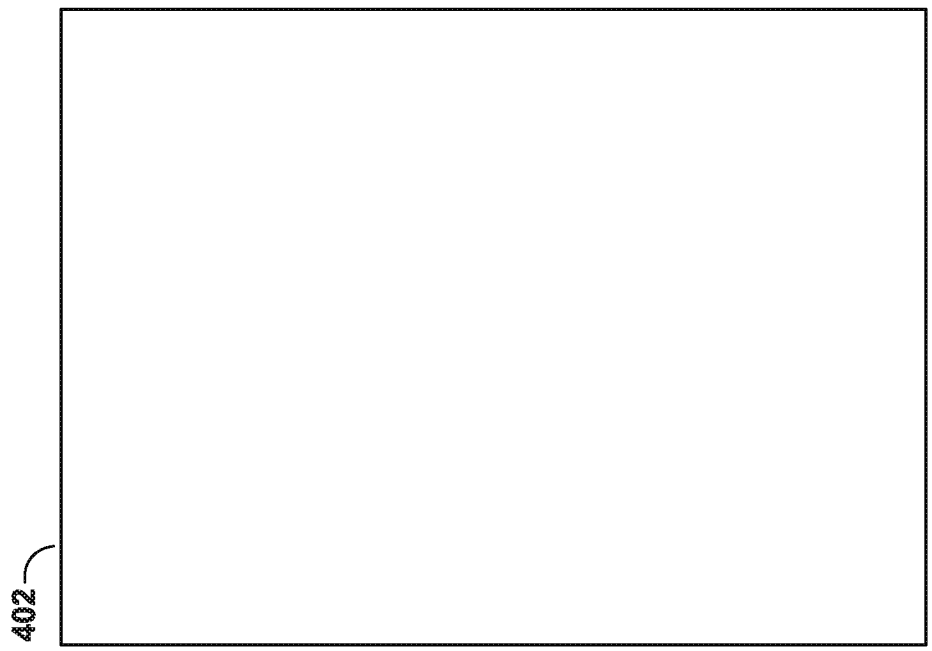
FIGS. 4A-4D are example images of the web of FIG. 3, in accordance with one or more exemplary implementations and techniques described in this disclosure.
Figure 4A:
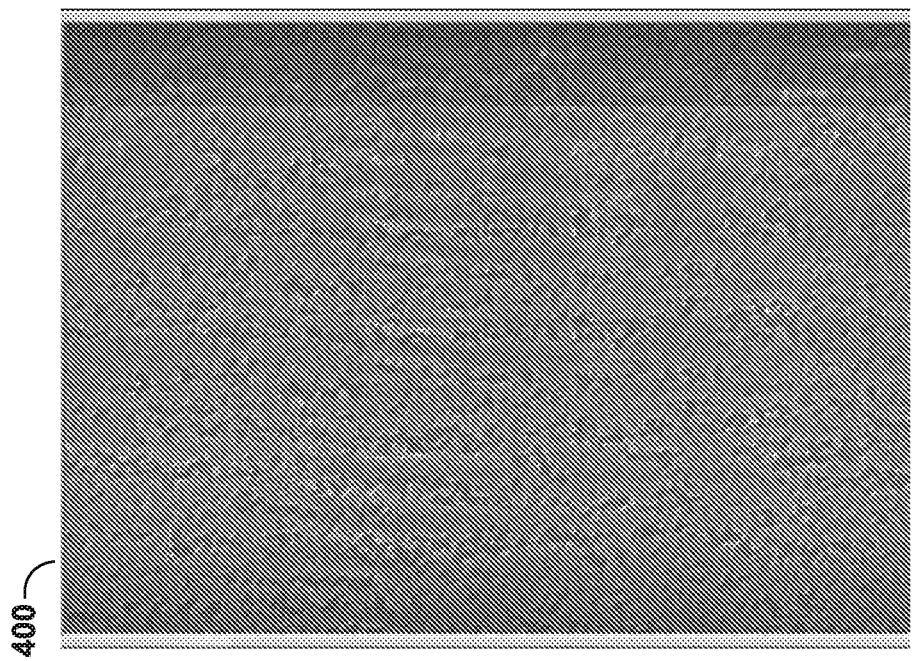

FIGS. 4A-4D are example images of the web 104 of FIG. 3, in accordance with one or more exemplary implementations and techniques described in this disclosure. FIGS. 4A-4B are example images of adhesive 312 of web 104.

In some examples, an image capture device (e.g., device 110A of FIGS. 1-2) captures image 400 of adhesive 312 of web 104 illustrated in FIG. 3. In one example, a filter (e.g., filter 111A of FIGS. 1-2) filters light to pass only the light emitted by fluorescing agent 314. Image capture device 110A detect the light passed by filter 111A and generates image 400 based on light 302.

In one example, processing unit 120 of FIGS. 1-2 receives image 400 and performs image thresholding on image 400 to generate image 402 illustrated in FIG. 4B. For example, when the intensity of a pixel satisfies (e.g., is at least) a threshold intensity, processing unit 120 may assign the pixel to one value (e.g., a particular color, such as black) that is indicative of a defect. Similarly, if the intensity of a pixel does not satisfy the threshold intensity, processing unit 120 may assign the pixel to another value (e.g., a different color, such as white) that is not indicative of a defect. In this way, processing unit 120 may processed image 402 based on the intensity of image 400.

Processing unit 120 may determine whether web 104 includes any defects based on image 402 (also referred to as processed image 402). For example, processing unit 120 may determine whether a layer of web 104 (e.g., adhesive 312) includes any defects by determining whether any pixels are assigned to the first value (e.g., black). That is, black areas or regions within image 400 may indicate that adhesive 312 of web 104 includes a defect. Said yet another way, if the intensity of an area does not satisfy the threshold intensity, this may indicate that adhesive 312 includes a defect. In some examples, processing unit 120 determines that adhesive 312 does not include a defect in response to determining that no areas of image 402 are assigned to the first value (or that a size of an area assigned to the first value does not satisfy a threshold size).

Figure 4D:
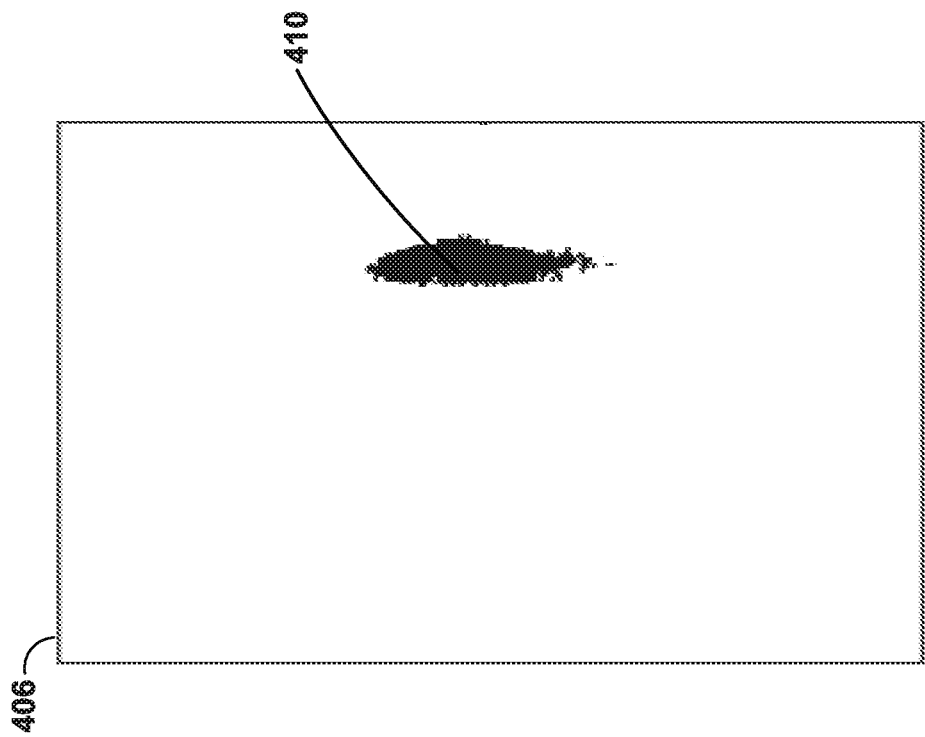
Figure 4C:
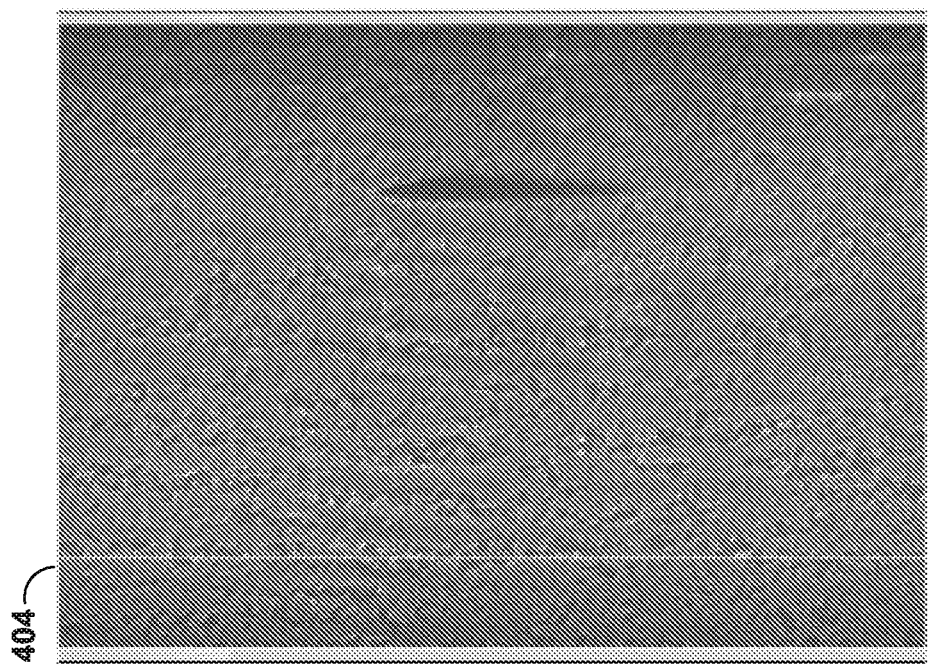

FIGS. 4C-4D are example images of low-adhesion backsize 322 of web 104. In some examples, an image capture device (e.g., device 110N of FIGS. 1-2) captures image 404 of a layer of web 104, such as low-adhesion backsize 322. In one example, a filter (e.g., filter 111N of FIGS. 1-2) filters light to pass only the light emitted by fluorescing agent 324. Image capture device 110N detect the light passed by filter 111N and generates image 404 based on light 306. In one example, area 328 of low-adhesion backsize 322 includes little or no fluorescing agent 324, such that image 404 may be relatively dark in the area 408 corresponding to area 328 of low-adhesion backsize.

In one example, processing unit 120 of FIGS. 1-2 receives image 404 and performs image thresholding on image 404 to generate image 406 illustrated in FIG. 4C, in a similar manner as described with reference to images 400 and 402.

Processing unit 120 may determine whether web 104 includes any defects based on image 406 (also referred to as processed image 406). For example, processing unit 120 may determine whether the layer (e.g., low-adhesion backsize 322) includes any defects by determining whether any pixels of image 406 are assigned to the first value (e.g., black). In the example of FIG. 4C, the intensity of pixels with area 408 may be greater than the threshold intensity. In such examples, area 410 of processed image 406 includes pixels assigned to the first value. In some examples, processing unit 120 determines that low-adhesion backsize 322 of web 104 includes a defect in response to determining that area 410 is assigned to the first value (or that a size of area 410 satisfies a threshold size).

In this way, processing unit 120 may determine whether web 104 includes a defect and identify or determine which layer of web 104 includes the defect. For example, adding fluorescing agents that emit light with different peak intensities to different layers of web 104 and filtering light emitted by the various layers may enable imaging unit 108 to capture images of the individual layers. Processing unit 120 may analyze the images of the individual layers as described above to detect defects and identify the layers that include defects.

Figure 5:
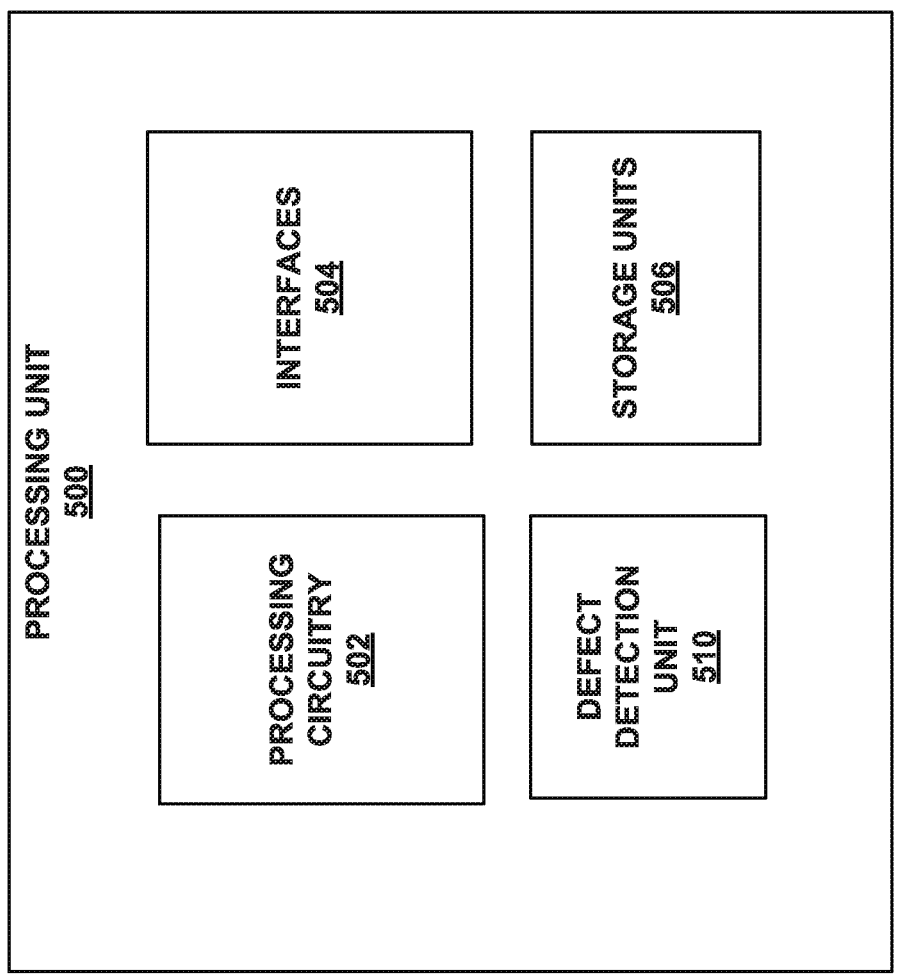
FIG. 5 is a block diagram illustrating an example processing unit, in accordance with at least one exemplary technique described in this disclosure.

FIG. 5 is a block diagram illustrating an example processing unit 500, in accordance with one or more exemplary implementations and techniques described in this disclosure. Processing unit 500 may be an example or alternative implementation of processing unit 120 of system 100 of FIG. 1. The architecture of processing unit 500 illustrated in FIG. 5 is shown for exemplary purposes only. Processing unit 500 should not be limited to the illustrated example architecture. In other examples, processing unit 500 may be configured in a variety of ways.

Processing unit 500 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, processing unit 500 is electrically coupled to inspection device 105 of FIG. 1. In other examples, Processing unit 500 represents a cloud computing system, server farm, and/or server cluster (or portion thereof) configured to connect with system 100 via a wireless connection. In other examples, processing unit 500 may represent or be implemented through one or more virtualized compute instances (e.g., virtual machines, containers) of a data center, cloud computing system, server farm, and/or server cluster. In some examples, processing unit 500 includes one or more computing devices, each of the computing devices having a memory and one or more processors.

As shown in the example of FIG. 5, processing unit 500 includes processing circuitry 502, one or more interfaces 504, and one or more storage units 506. Processing unit 500 also includes a defect detection unit 510, which may be implemented as program instructions and/or data stored in storage units 506 and executable by processing circuitry 502. Storage units 506 of processing unit 500 may also store an operating system (not shown) executable by processing circuitry 502 to control the operation of components of processing unit 500. The components, units or modules of processing unit 500 are coupled (physically, communicatively, and/or operatively) using communication channels for inter-component communications. In some examples, the communication channels include a system bus, a network connection, an inter-process communication data structure, or any other method for communicating data.

Processing circuitry 502, in one example, may include one or more processors that are configured to implement functionality and/or process instructions for execution within processing unit 500. For example, processing circuitry 502 may be capable of processing instructions stored by storage units 506. Processing circuitry 502, may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Processing unit 500 may utilize interfaces 504 to communicate with external systems via one or more networks. In some examples, interfaces 504 include an electrical interface (e.g., at least one of an electrical conductor, a transformer, a resistor, a capacitor, an inductor, or the like) configured to electrically couple processing unit 500 to inspection device 105. In other examples, interfaces 504 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, processing unit 500 utilizes interfaces 504 to wirelessly communicate with external systems, e.g., inspection device 105 of FIG. 1.

Storage units 506 may be configured to store information within processing unit 500 during operation. Storage units 506 may include a computer-readable storage medium or computer-readable storage device. In some examples, storage units 506 include one or more of a short-term memory or a long-term memory. Storage units 506 may include, for example, random access memories (RAM), dynamic random access memories (DRAM), static random access memories (SRAM), magnetic discs, optical discs, flash memories, magnetic discs, optical discs, flash memories, or forms of electrically programmable memories (EPROM) or electrically erasable and programmable memories (EEPROM). In some examples, storage units 506 are used to store program instructions for execution by processing circuitry 502. Storage units 506 may be used by software or applications running on processing unit 500 to temporarily store information during program execution.

In some examples, defect detection unit 510 is configured to automatically detect defects in one or more layers of a web, such as web 104 of FIGS. 1-4. For example, defect detection unit 510 may detect whether web 104 includes a defect as described above. In one example, defect detection unit 510 detects that web 104 includes a defect and determines which layer of the web 104 includes the defect. In some examples, defect detection unit 510 determines a type of a defect and/or a cause of the defect, as described above.

Processing unit 120 performs an action in response to determining that web 104 includes a defect. In one example, the action includes outputting a notification indicating that web 104 includes a defect. In some instances, the notification also includes data indicating a type of the defect, a cause of the defect, a location of the defect, a size of the defect, or a combination thereof.

In some examples, the action includes outputting a command that causes manufacturing process 102 to pause or stop manufacturing web 103. In another example, the action includes outputting a command causing a dispensing unit of the manufacturing process 102 to adjust a volume of coating and/or fluorescing agent applied to web 104, adjust a position of a dispensing unit such that the dispensing unit applies the coating and/or fluorescing agent to web 104 with a more uniform distribution, or both.

Figure 6:
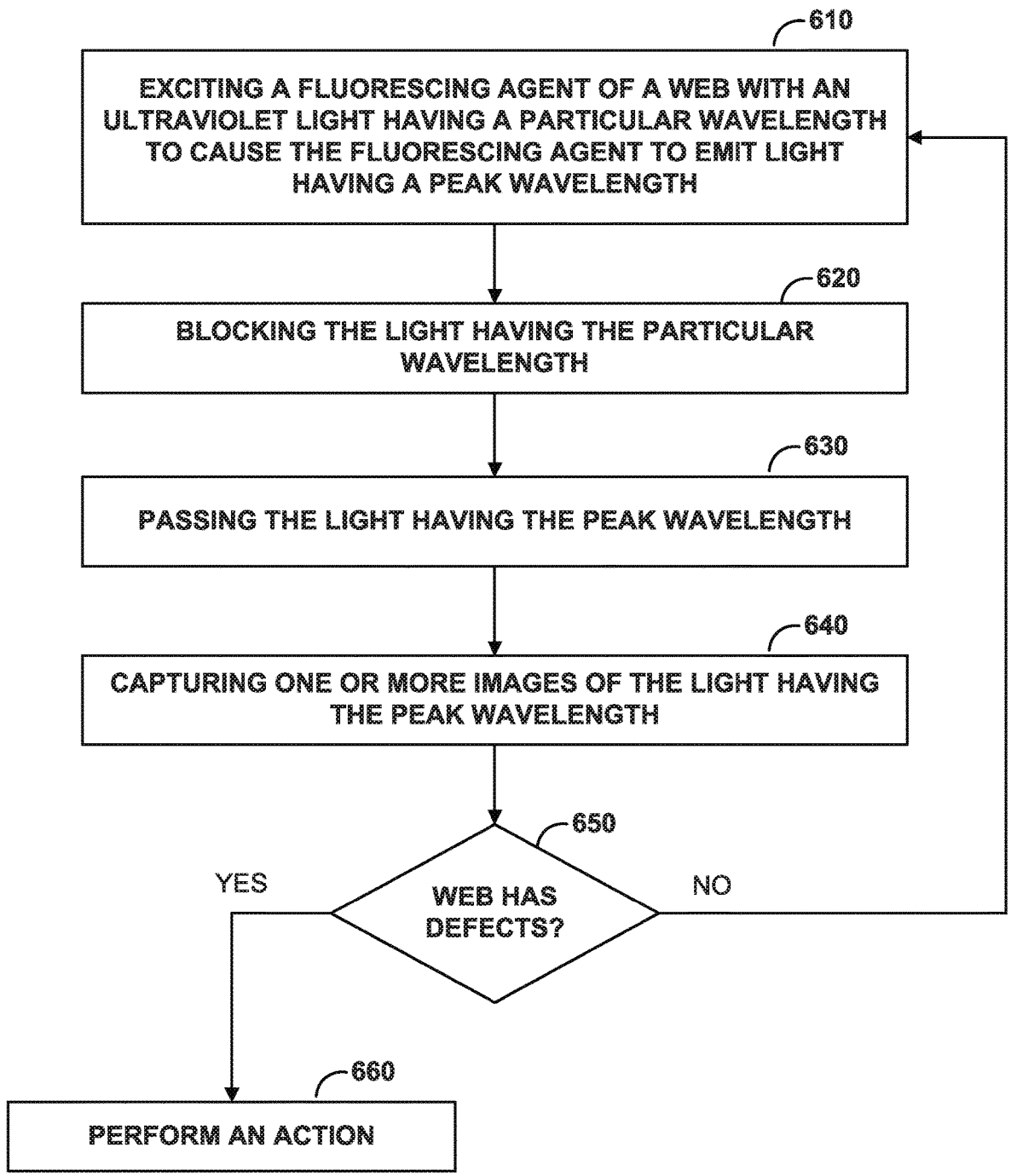
FIG. 6 is a flow diagram illustrating an example operation of detecting a defect in a web using a processing unit, in accordance with one or more exemplary implementations and techniques described in this disclosure.

FIG. 6 is a flow diagram illustrating an example operation of detecting a defect in a web using a processing unit, in accordance with one or more exemplary implementations and techniques described in this disclosure.

One or more lighting units 107 excite a fluorescing agent (e.g., fluorescing agent 324) of web 104 with an ultraviolet light having a particular wavelength (610). Web 104 may include a plurality of fluorescing agents. In one instance, web 104 includes a plurality of layers that each include a respective fluorescing agent. Exciting fluorescing agent 324 with ultraviolet light causes fluorescing agent 324 to emit light having a peak wavelength. The peak wavelength may be within the ultraviolet spectrum or the visible spectrum.

A filter 111 of an imaging unit 108 blocks light having the particular wavelength (620) and passes light having the peak wavelength (630). Examples of filters include a longpass filter or a bandpass filter. In some examples, imaging unit 108 includes a plurality of filters that are each configured to pass wavelengths of light that satisfy a threshold wavelength or wavelengths of light between two threshold wavelengths. For example, a first filter 111A may pass light having emitted by a first fluorescing agent 314 and a second filter 111N may pass light emitted by a second fluorescing agent 324.

Image capture units 110 capture one or images of light having the peak wavelength (640). In one example, a first image capture device 110A captures images of adhesive 312 of web 104 by detecting light emitted by fluorescing agent 314 that has a first peak wavelength. In one example, a second image capture device 110N captures images of low-adhesion backsize 322 of web 104 by detecting light emitted by fluorescing agent 324 that has a second peak wavelength.

A processing unit 120 determines whether web 104 includes a defect (650). In one example, processing unit 120 determines web 104 includes a defect in response to determining that an intensity of an area within one of the images of web 104 does not satisfy a threshold intensity. In another example, processing unit 120 determines web 104 includes a defect in response to determining that a size of the area is greater than a threshold size.

Responsive to determining that web 104 includes a defect ("YES" branch of 650), processing unit 120 performs at least one action (660). In one example, the action includes outputting a notification indicating that web 104 includes a defect. In some scenarios, the action includes outputting a command that adjust the manufacturing process 102. For example, the command may cause manufacturing process 102 to pause or stop manufacturing web 104 In another example, the command causes a dispensing unit of the manufacturing process 102 to adjust a volume of coating and/or fluorescing agent applied to web 104, adjust a position of a dispensing unit such that the dispensing unit applies the coating and/or fluorescing agent to web 104 with a more uniform distribution, or both.

Responsive to determining that web 104 does not include a defect ("NO" branch of 650), inspection device 105 continues automatically inspecting webs 104 by illuminating web 104 with an ultraviolet light to exciting fluorescing agents within the web and analyzing images of the web 104 that are captured while web 104 is illuminated with the ultraviolet light.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include RAM, read only memory (ROM), programmable read only memory (PROM), EPROM, EEPROM, flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

Various examples have been described. These and other examples are within the scope of the following claims.

What is claimed is:

1. A system for detecting defects in a web, the system comprising:
an inspection device comprising:
a lighting unit configured to emit ultraviolet light having a first wavelength to the web, the web comprising a fluorescing agent configured to emit light having a second wavelength upon excitation by the ultraviolet light having the first wavelength, the first wavelength different from the second wavelength;
a filter configured to block the first wavelength and pass the second wavelength; and
an image capture device configured to capture one or more images of the light having the second wavelength after the light having the second wavelength has passed through the filter; and
a processing unit configured to:
determine, based on the one or more images, whether the web includes a defect; and
output data indicating whether the web includes the defect,
wherein the processing unit is further configured to determine a type of the defect by at least:
determine the type of defect includes a streak in the fluorescing agent in response to determining a length of a defect area satisfies a threshold length and determine the cause of the streak includes a dirty dispensing unit,
determine the type of defect includes blemishes in the fluorescing agent in response to determining that the web includes a plurality of defect areas and determine the cause of the blemishes includes air bubbles within the dispensing unit, or
determine the type of defect includes a non-uniform distribution of the fluorescing agent in response to determining that one side of the image is at least a threshold amount darker than another side of the image and determine the cause of the non-uniform distribution includes a mispositioned dispensing unit.

2. The system of claim 1, wherein the lighting unit is one of a plurality of lighting units, each lighting unit of the plurality of lighting units configured to emit ultraviolet light having a different respective wavelength of a plurality of wavelengths.

3. The system of claim 1, wherein the web includes a plurality of layers that each include a respective one of a plurality of fluorescing agents that includes the fluorescing agent, each of the plurality of fluorescing agents configured to emit light having a different respective peak wavelength of a plurality of peak wavelengths.

4. The system of claim 3, wherein a first layer of the plurality of layers includes a first fluorescing agent of the plurality of fluorescing agents, wherein a second layer of the plurality of layers includes a second fluorescing agent of the plurality of fluorescing agents, wherein the first fluorescing agent is configured to emit light upon excitation by the ultraviolet light and the second fluorescing agent is configured to emit light upon excitation by a visible light.

5. The system of claim 1, wherein the light having the second wavelength is visible light.

6. The system of claim 1, wherein the ultraviolet light is a first ultraviolet light and the light having the second wavelength is a second ultraviolet light.

7. The system of claim 1, wherein the filter includes at least one of a bandpass filter or a longpass filter.

8. The system of claim 1, wherein the processing unit is configured to determine whether the web includes the defect by at least being configured to:
determine whether an intensity of an area of the image satisfies a threshold intensity; and
determine the web includes a defect in response to determining that the intensity of the area of the image does not satisfy the threshold intensity.

9. The system of claim 1, wherein the processing unit is further configured to:

output a command that causes a dispensing unit to adjust a volume of the fluorescing agent applied to the web to adjust a thickness of the fluorescing agent, or output a command controlling the dispensing unit to adjust a spatial distribution of the fluorescing agent to the web.

10. The system of claim 1, wherein a luminosity of the lighting unit is at least 500 Watts per square meter.

11. The system of claim 1, wherein the imaging capture device includes a time-delay integration camera having a sensitivity of at least $$4{,}000\ \frac{LSB}{\frac{nJ}{cm^2}}.$$

12. The system of claim 1, wherein the web includes a first layer and a second layer, wherein the first layer on one side of the web includes an adhesive and the second layer on the other side of the web includes a low-adhesion backsize coating , wherein the low-adhesion backsize coating includes the fluorescing agent.

13. The system of any of claim 1, wherein the processing unit comprises one or more computing devices, each of the computing devices having a memory and one or more processors.

14. A web comprising:

a first layer comprising a first fluorescing agent configured to emit light having a first peak wavelength upon excitation by ultraviolet light having a first particular wavelength, the first peak wavelength different than the first particular wavelength, wherein the first layer includes a low-adhesion backsize that includes the first fluorescing agent; and a second layer comprising a second fluorescing agent configured to emit light having a second peak wavelength upon excitation by ultraviolet light having a second particular wavelength, the second peak wavelength different than the first peak wavelength, the first particular wavelength, and the second particular wavelength.

15. The web of claim 14, wherein the light having the first peak wavelength and the light have the second peak wavelength are visible light.

16. The web of claim 14, wherein the light having the first peak wavelength and the light have the second peak wavelength are ultraviolet light.

17. The web of claim 14, wherein the first particular wavelength and the second particular wavelength are different.

\* \* \* \* \*